United States Patent [19]
Bertram

[11] Patent Number: 4,881,443
[45] Date of Patent: Nov. 21, 1989

[54] MUSIC TEACHING APPARATUS

[75] Inventor: Howard W. Bertram, Carleton Place, Ontario, Canada

[73] Assignee: Mutech - Music Technologies, Inc., Ontario, Canada

[21] Appl. No.: 227,617

[22] Filed: Aug. 3, 1988

[51] Int. Cl.$^4$ .............................................. G09B 15/02
[52] U.S. Cl. ...................................................... 84/473
[58] Field of Search ................................. 84/471–475, 84/477–482, 485 R, 485 SR

[56] References Cited

U.S. PATENT DOCUMENTS

| | | | |
|---|---|---|---|
| 2,332,842 | 10/1943 | Champion | 84/473 |
| 3,842,708 | 10/1974 | Leonard | 84/485 SR |
| 3,937,118 | 2/1976 | Leonard | 84/485 X |
| 4,069,735 | 1/1978 | Bertram | 84/474 |
| 4,305,323 | 12/1981 | Graham | 84/474 |

FOREIGN PATENT DOCUMENTS 15417 of 1892 United Kingdom ................. 84/474

Primary Examiner—L. T. Hix
Assistant Examiner—Brian W. Brown
Attorney, Agent, or Firm—Arnold, White & Durkee

[57] ABSTRACT

The apparatus includes a base associated with a rotatable display disc representing notes of a musical keyboard, such notes being separated by spaced intervals in proportion to the musical intervals of pitch between the indicated notes. The base has a longitudinally moveable section which may be brought into registry with another indicia to provide visualization of the interrelationship between musical notes. The apparatus may include a keyboard as the longitudinally moveable section, and indicia relative to the longitudinally moveable section may indicate chords relative to a base note.

19 Claims, 5 Drawing Sheets

MUSIC TEACHING APPARATUS

FIELD OF THE INVENTION

This invention relates to apparatus for assisting in the study and learning of music principles and harmony.

BACKGROUND

Sound arises from a vibrating body and musical sound results from the interdependency of vibrations or notes as expressed by the existence of overtones and harmonies. The notes used in a musical scale have fixed rates of vibration which are mathematically interrelated.

For historical reasons, the musical alphabet starts from C (not A) and the octave C to C is given the notation C, D, E, F, G, A, B, C, eight notes represented for example by the white keys on a piano keyboard. The octave, "key" or "scale of C major" can also be given an easily singable syllable wherein C, D, E, F, G, A, B, C become doh, ray, me, fah, soh, lah, te, doh. Whether one uses alphabetical symbols C, D, E, etc. or singable symbols doh, ray, me, etc., there is represented an organized system of vibrations that have a definite mathematical relationship.

Although there are five authentic diatonic modes of music, the most familiar modes of music in Western culture are the "major" mode (also known as the Ionian mode) and the "minor mode" (also known as the Aeolian mode) from which major scales and minor scales are derived.

Each mode of music comprises a series of scales known as diatonic scales, one of which is the scale of C major, and each scale comprises a series of seven steps rising from one tone to its octave such as the C to C octave of the C major scale noted above. The steps or intervals between the notes in a scale are either a tone or semi-tone and each mode of music has its own characteristic sequence of tone/semitone steps or intervals between successive notes of its scale.

The tone/semitone relationship is a third way of expressing relationships of note pitch and also may be used to visually express the mathematical relationship of ratios of pitch. A scale has 12 semitones and the arrangement of these tones/semitones holds the key to which scale constitutes either a major or minor mode. (By definition a musical scale is a series of tones arranged in sequence of rising and falling pitches in accordance with any of various systems of intervals).

The major (Ionian) mode of music has a sequence of steps or intervals (using the key of C major as exemplary) of:

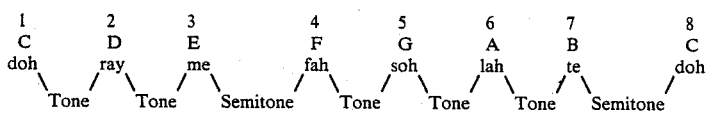

whereas the minor (Aeolian) mode of music has a sequence of steps or intervals of:

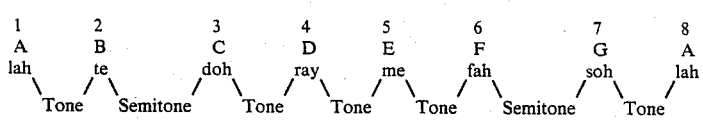

A chord in harmonic music is the simultaneous sounding of tones, usually three or more and in any musical composition, an integral part is the triad chords which are largely responsible for conferring melodic and harmonic characteristics to musical compositions. A triad consists of three notes comprised of alternate notes (e.g. 1, 3 and 5 intervals) of the diatonic scale of the composition within the particular mode of music. The chord is generally referred to by its "base" or lowest note of the chord. For example, in the C major diatonic scale, there are the following (triad) chords:

first—C, E, G;
second—D, F, A;
third—E, G, B;
fourth—F, A, C;
fifth—G, B, D;
sixth—A, C, E;
seventh—B, D, F.

Within the major (mode) Diatonic scales, a triad chord may be a major chord, a minor chord or a diminished chord, the type of chord being determined by the interval of pitch (tone/semitone) between adjacent notes making up the triad chord. The intervals of pitch (tones/semitones) between notes is, as noted above, determined by the mode of music under consideration (e.g. major or minor diatonic scales). Thus whether a triad chord is a major, minor or diminished chord is dependent on the diatonic scale as well as the base note of the chord under consideration.

By way of example, the first triad chord in the C major diatonic scale above is C, E, G (alternate notes) and the tonic intervals (looking at the major tonic scale above) between the alternate notes is respectively 2 tones (C-E) and 1½ tones (E-G) which are the characteristic intervals of a major chord. Accordingly this C chord is known as C - major chord (in the major diatonic scale). The second triad chord noted above is D, F, A and the tonic intervals are 1½ tones (D-F) and 2 tones (F-G). This is characteristic of a minor chord (D minor chord in the major diatonic side).

From a review of all of the above Triad chords in conjunction with the major tonic scale above, the following will be noted:

|     | Triad Chord | Tonic Separation | Chord Characteristic |
| --- | --- | --- | --- |
| (1) | C, E, G | 2 Tones (C-E); 1½ Tones (E-G) | Major |
| (2) | D, F, A | 1½ Tones (D-F); 2 Tones (F-A) | Minor |
| (3) | E, G, B | 1½ Tones (E-G); 2 Tones (G-B) | Minor |
| (4) | F, A, C | 2 Tones (F-A); 1½ Tones (A-C) | Major |
| (5) | G, B, D | 2 Tones (G-B); 1½ Tones (B-D) | Major |
| (6) | A, C, E | 1½ Tones (A-C); 2 Tones (C-E) | Minor |
| (7) | B, D, F | 2 Tones (C-E) 1½ Tones (B-D); | Diminished |

| Triad Chord | Tonic Separation | Chord Characteristic |
|---|---|---|
| | 1½ Tones (D–F) | |

The chord B, D, F (No.7) has tonic intervals of 1½ tones and 1½ tones, characteristic of a diminished chord and is known as the B diminished chord in the C major scale.

Each note of a diatonic scale within a given mode of music can thus be assigned a designation of major, minor or diminished which denotes the character of the triad chord within the mode of music which uses the note as the base note. Since the character of a triad chord indicates its type of structural sound and harmony, a familiarity with the character of chords derived from a given base note in a particular mode of music is helpful in understanding musical structures and making and understanding musical compositions and their melodic forms. Further the chords noted above with "major chord" characteristics of tonic intervals namely the 1st, 4th and 5th chords are known as Prime Chords and they hold many inherent relationships within music.

My earlier U.S. Pat. No. 4,069,735 granted Jan. 24, 1978 provides a teaching and computation device in the form of a slide rule having a base display part with indicia characteristic of different modes of music and includes a second rotatable display part having indicia which can be brought into registry with the indicia on the first part so as to compute chords and scales in any of the presented modes of music. However, such device does not provide a simplified apparatus which includes a representation of a keyboard which is selectively moveable in conjunction with additional indicia on the base display part to interrelate the computational theory with the realities of the keyboard.

SUMMARY OF THE INVENTION

Accordingly, there is a need for a simple apparatus to provide a means for the initiate as well as the more experienced to study and compute chords and scales in any presented given mode of music, particularly the major and minor scales and relate the theory to the realities of the keyboard.

The invention provides a base component having radiating lines for use with a second relatively rotatable display disc having indicia thereon representing notes of a musical keyboard separated by spacial intervals in proportion to the musical intervals of pitch between the notes represented thereby. Further, the base component has a certain other indicia so that a second, longitudinally movable part may be brought into registry with the other indicia on the base component to provide visualization of the interrelationship of notes provided by the moveable disc and base component. In one embodiment the other indicia is a linear array of lines having a spacial arrangement to coincide with the keys on a keyboard making up the second movable part. In another embodiment the other indicia on the base component is the keyboard indicia and the second movable part includes the spatially arranged linear array of lines.

Chord relationships may be shown on the apparatus by the marking of fixed relationships and appropriate internalized note names making up a chord and shown on the disc/base components. The spacing of tones/semitones can be marked on the linear arranged lines and with the unique interaction of the lines, with the second movable part, chords as they would be played on a keyboard can be shown.

More particularly the invention pertains to music teaching apparatus comprising a display base, a circular display disc rotatably associated with the base, and a display keyboard. In one embodiment the base having first indicia including a circular array of twelve equally spaced radially extending lines and second indicia spaced from the first indicia, the second indicia including a linear array of thirteen, equally spaced, parallel lines. The disc has third indicia in a circular array, the third indicia representing twelve notes of an octave, which notes are at intervals of two and one-half tones on a musical scale, and the progression of notes in the clockwise direction being according to 4th intervals and in the counterclockwise direction being in accordance with 5th intervals, the notes being angularly spaced for registration with the lines of the first indicia. In the first embodiment the keyboard comprises a moveable representation of at least one octave of a piano keyboard including white and black keys, the spacing of the keys coinciding substantially with the spacing of the linear array of lines of the second indicia. Registration of a note from the disc third indicia with a line of the first indicia at the 12 o'clock position, denoted as a base note, provides registration of other notes of the third indicia with other lines of the first indicia, and provides information about the prime chords of the base note from the registration of the base note and registration of notes of the other notes in registration with the 1 and 11 o'clock positions. Further registration of the base note key as represented on the keyboard with the 1st line of the second indicia provides spacial information as to the prime chords of the base note on the keyboard in registration with the 1st line, the sixth line and the eighth line of the second indicia from the left.

Preferably the three lines of the first indicia in the 11, 12 and 1 o'clock positions are highlighted relative to the other first indicia lines and three lines of the second indicia, namely the first, sixth and eighth lines from the left thereof are highlighted relative to the other second indicia lines. The highlights may be by way of line thickness or colour. If colour, the highlighting of the lines is with the same colour.

In an alternative, the linear array of thirteen equally spaced lines may be on a movable display part with the representation of the keyboard as part of the base component.

Various other indicia may be imprinted on or erasably associated with the elements of the apparatus to provide additional visual assistance to the user of interrelationships of notes and chords of a scale.

Other aspects of the invention will become apparent from the description of the preferred embodiments of the invention.

DESCRIPTION OF PREFERRED EMBODIMENTS

Figure 1:
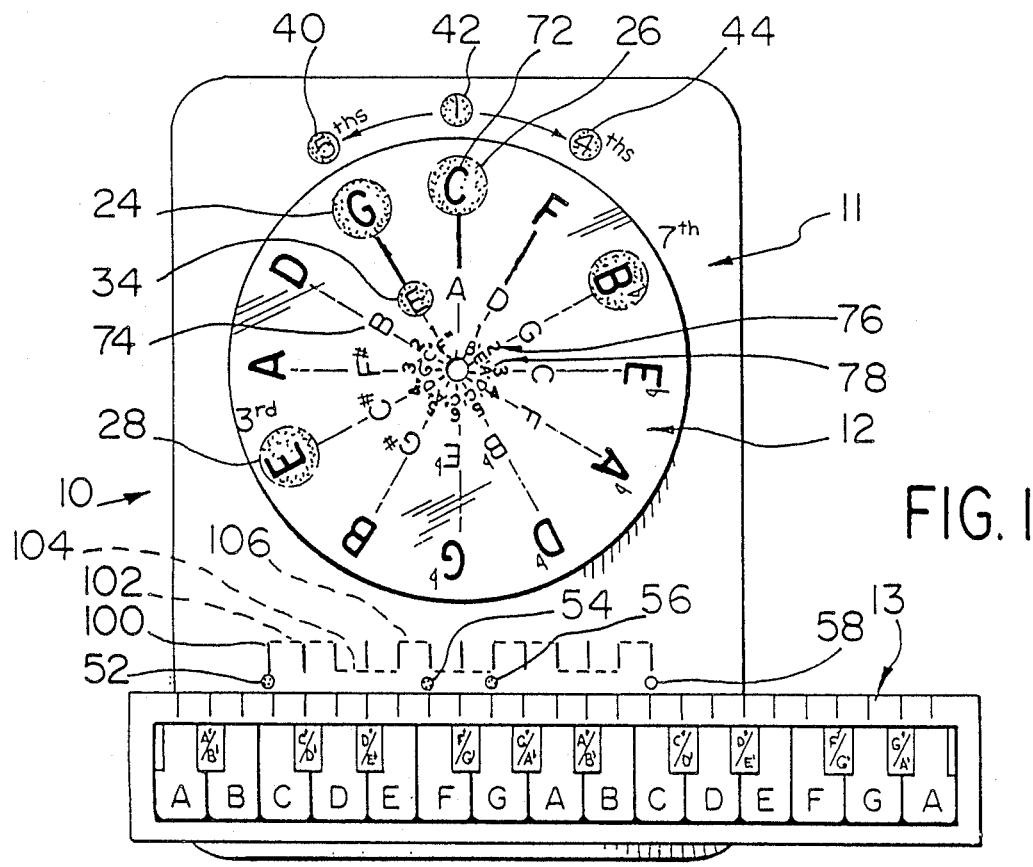
FIG. 1 is a plan view of the invention showing the base, disc and keyboard sheet combination.
Figure 2:
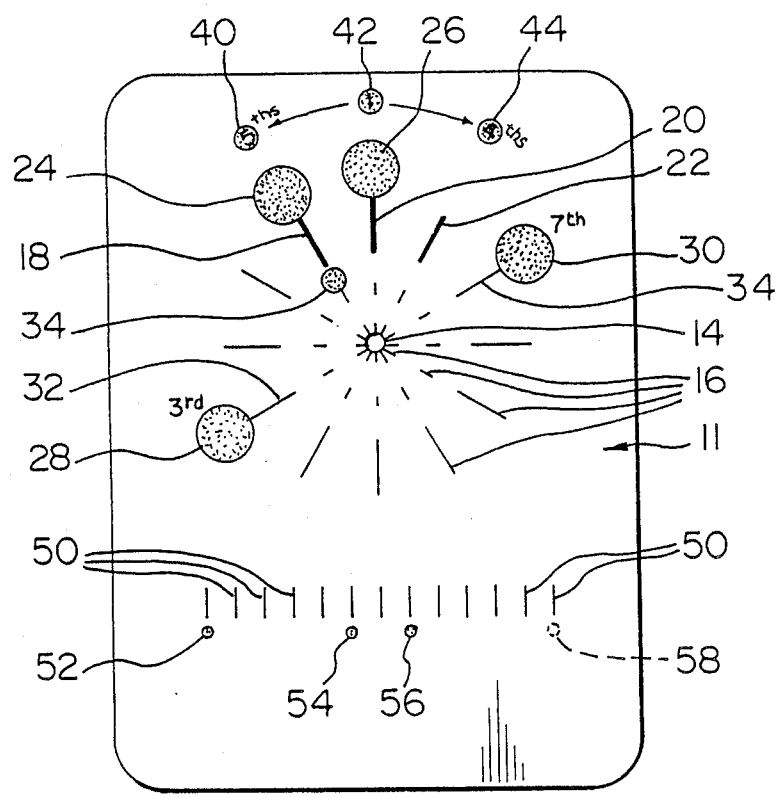
FIG. 2 is a plan view of the base plate above.
Figure 3:
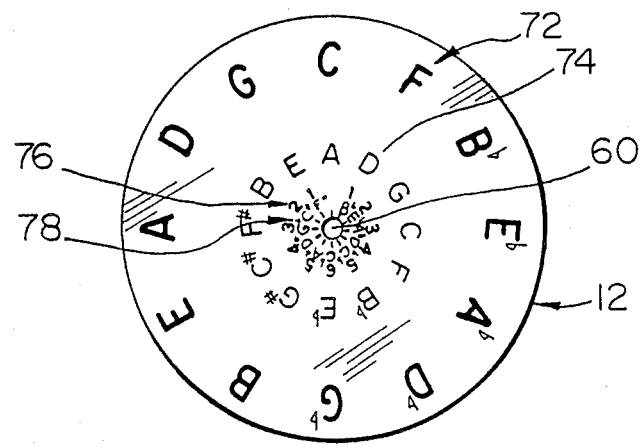
FIG. 3 is a plan view of the disc above.
Figure 4:
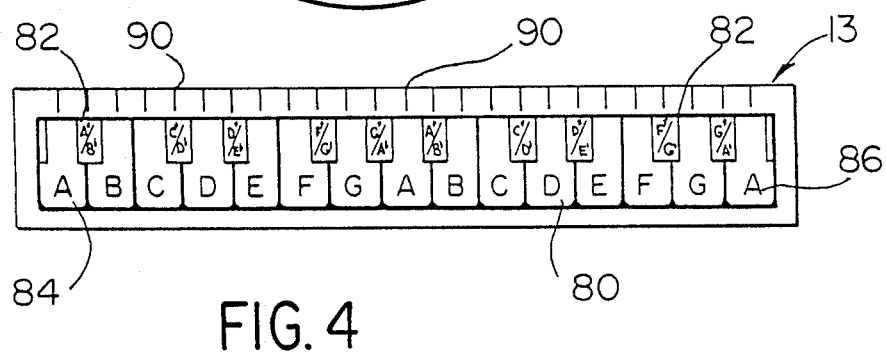
FIG. 4 is a plan view of the keyboard sheet.

FIG. 1 shows the computation and teaching device 10 comprised of base 11, transparent disc 12 and keyboard plate 13 as assembled for use. FIGS. 2, 3 and 4 illustrate the base 11, disc 12 and keyboard plate 13 separately.

More particularly, FIG. 2 shows base plate 11 of generally rectangular configuration having center 14 which is suitably apertured to receive a pivotal connection. Extending radially outwardly from center 14 are a plurality of lines 16, equiangularly spaced and separated by an angular distance (33⅓°) representing two and one half (2½) tones. There are 12 of these lines. The radial gaps in lines 16 coincide with indicia on disc 12 to be referred to below.

Three of the lines 16, namely at the top of base 11, lines 18, 20 and 22 are wider (or alternatively could be of a different color) than the remaining ones of lines 16.

Supertending lines 18 and 20 are indicia 24 and 26 respectively (shown as circles) and similar indicia 28 and 30 also supertend diametrically opposite radial lines 32 and 34 of lines 16. Line 18 also has a small indicia 34 (shown as a circle) between center 14 and indicia 24.

Above indica 24 and 26 (as seen in FIG. 2) are smaller indicia 40 and 42 respectively and indicia 44 is above radial line 22. The indicia 40, 42 and 44 are labelled with notation "5ths", "1" and "4ths" respectively and indicia 28 and 30 are labelled with notation "3rd" and "7th" respectively.

Also on base 12 are a plurality (13 are shown) of evenly spaced lines 50 with (circular) indicia 52, 54, 56 and 58 (shown as small circles) subtending the first, sixth, eighth and thirteenth lines from the left.

Preferably indicia 52, 54, 56 and 58 as well as indicia 34, 40, 42 and 44 and lines 18, 20 and 22 are color coded the same color which is distinct from any color coding of indicia 24, 26, 28 and 30. By way of example, my preference is to have lines 16 and 50 generally black thin lines with indicia 50, 52, 54, 56 and 58, indicia 34, 40, 42 and 44 and lines 18, 20 and 22 yellow whereas indicia or dots 24, 26, 28 and 30 are light blue. However it will be appreciated thin other contrasting colors are equally possible. The surface of base 11 is preferably the type of material which can be written on with a felt tip marker and easily erased for reasons which will become more apparent herein.

Disc 12 of plastic material has center 60 suitably apertured for pivotal connection to base 11 at center 14. Disc 12 also has four circular series of indicia 72, 74, 76 and 78. Series 72 (preferably black lettering) is composed of indicia corresponding to certain notes in a major scale being represented in a sequence in which the notes appear on a musical keyboard and spaced apart by an angular interval corresponding to the interval of musical pitch between the notes which they represent which angular interval represents two and one half (2½) tones. Therefore the angular spacing of the series 72 of note indicia is the same as the angular spacing of radial lines 16. Accordingly when the disc and base are assembled, the series 72 of indicia can be registered with the respective radial lines 16.

Indicia series 74 (smaller letters and preferably of a different color such as red letters than the color of the indicia series 72 black) is composed of indicia corresponding to the notes they represent in the related minor scale having the same key signature as the major scale represented by the indicia of series 72. Series 76 and 78 (preferably black numbers and blue note signatures respectively) of indicia on disc 12 indicate the respective key signatures of the indicia on both series 72 and 74 in registry therewith. Thus indicia A of series 74 registers in line with indicia C of series 72 showing that the A minor scale has the same key signature as C major scale (namely, no sharps or flats). Further, it is shown that the key of D major (series 72) and B minor (series 74) have a key signature of two (2) sharps namely F♯ (F sharp) and C♯ (C sharp) (i.e. number 2 in series 76 and F♯ and C♯ in series 78).

Keyboard 13 has printed thereon a two octave keyboard with (white) keys 80 and (black) keys 82 from keynote "A" 84 to a keynote "A" 86 two octaves higher. Above but adjacent each of the white and black keys represented by 80 and 82 is a line 90, the spacial arrangement of lines 90 such that they coincide with the spacial arrangement of lines 50 on base 11. Keyboard 13 is an integral part of the appartus for use in conjunction and cooperation with lines 50 on base 11. In FIG. 1, keyboard is shown aligned with lines 50 by simply resting on the base 11 although as will be more apparent herein, more physical means for slidable association are contemplated within the invention. It will also be apparent that at least the lower portion of base 11 and keyboard 13 could be constructed to be magnetically associated by the use of strip metal/magnetic material or known technology.

As noted in the background of the invention, in all modes of music and in all scales, there are three prime chords. In the major scales (Ionian modes), the note names which fall on the 1st, 4th and 5th degrees (notes) of the scale represents the chord name of the prime chords, e.g. C major, F major and G major of the scale of C. Further, each cord of a scale comprises a triad of the base note or degree (1) as the lowest note and the two alternatively spaced notes thereabove (the 3rd and 5th notes). Further, a tetrachord is a series of four ascending pitches with intervallic structure of 2 tones/1 semitone in variable order. Each mode has 2 tetrachords within an octave range of 12 semitones.

With the invention, various internal arrangements of notes and chords such as the above can be visually illustrated and other arrangements will become more evident herein from the exemplary embodiments referred to below.

By way of example looking at FIG. 1 wherein letter C (for C major scale) from indicia series 72 is located on indicia 26 and from aligning the first "C" on keyboard 13 with the leftmost line 50 and indicia 52, the following is to be noted:

(1) the first chord with base note C is C, E, G reading the letters overlying indicia 26, 28 and 24 in that order (e.g. the "1st", "3rd" and "5th" notes, (2) the major (prime) chords in the scale of C major have base notes C, F and G (from the heavier or colored lines 20, 22 and 18 in that order) and with indicia 42, 44 and 40 also indicating the "1st", "4th" and "5th" notes in the scale respectively, (3) the key signature of C major is no sharps or flats (from series 76 and 78), (4) the related minor scale of C major is A minor (from series 74) having the same key signature as C major, namely, no sharps or flats (see from series 76 and 78). (A D E are the prime chords of related A minor scale and indicia 34, overlapped by E visually points out that the 5th interval or note E of the minor harmonic scale A has a major sounding (7th) chord), (5) the note names can be visually read on the keyboard 13 that make up the scale of C major, and (6) the keyboard 13 also shows the note names of the base notes of the prime chords of C major, namely C, F, G (1lst, 4th and 5th degrees) opposite indicia 52, 54 and 56 and the lines associated therewith and with keys C, F, G.

(7) indicia 52–54 and 56–58 opposite keys C–F and G–C reference the correct division of the octave for the tetrachord structure of C major.

The three indicia 52, 54 and 56 therefore, namely, the small circles on scale 50 in conjunction with indicia 58 show with keyboard 13 not only the note names that represent the prime chords of harmony but they double in function to naturally divide any authentic modal scale into tetrachords.

Figure 5:
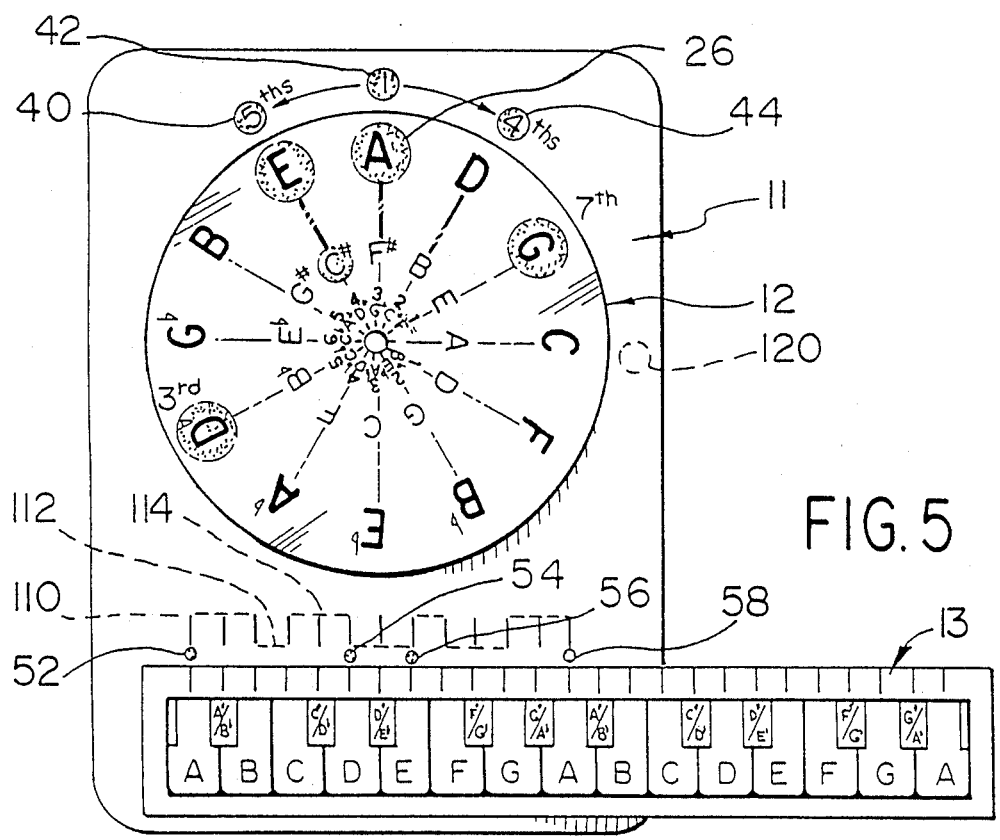
FIGS. 5, 6, 7 and 8 are views like FIG. 1 of the combinations, showing the use of the invention and with various additional, optional notations or indicia.

To enhance the illustration of tonic intervals for the keyboard 13, lines 102, 104, 106 and the like, shown in FIGS. 1 and 2 as dotted lines, may be drawn by a suitable pen or felt tip marker which can be easily erasable from the surface of base plate 11. The lines 102, 104 and 106 on indicia 50 represent "tone" (102, 104) and "semitone" (106) intervals respectively for a major scale. These lines 102, 104, 106 and the like, depicting the tone/semitone interval for the major scale, could be permanent on the base plate. However having a base plate on which erasable lines may be drawn with a felt tip marker or the like enables the student to appreciate the intervallic relationship of notes or degrees for the major scale of music. Further, the lines 102, 104, 106 and the like can be erased and replaced by lines 110, 112, 114 and the like shown in FIG. 5 for a minor mode of music, where the student now sees the intervallic relationship with keyboard 13 for minor scales of music. From FIG. 5 for example, the "A" minor scale is shown with its prime chords A D E shown from the keyboard 13 (indica 52, 54 and 56) as A D E. The triad A C E (alternate notes "1", "3rd", "5th") is also clearly shown. From the disc base elements, the indicia A is located as shown over indicia 26 (under indicia 42, i.e. "1") and the prime chords A D E are clearly shown (i.e. the "1", 4th and 5th notations). However the minor A scale has a minor "3rd" which is down a semitone from the "3rd" of the major A scale. In order to read the minor "3rd", FIG. 5 shows marker 120, shown in dotted lines. Remembering to use this location reference mark for minor scales, the disc/plate elements provide the triad A C E. It will be apparent that the location of marker 120 could be under the disc if a permanent indicia was desired. The indicia 28 and 120 could also be labelled M 3rd (major 3rd) and "m 3rd" (minor 3rd).

The above brings out another aspect of my invention in that not only can the student draw the intervallic tonal relationship of major or minor scales on lines 50, he/she can use adhesive markers like 120, shown in dotted lines, or use an erasable pen or felt tip marker to identify a reference location such as that for the minor "3rd". Accordingly, my invention also contemplates the use of other means of temporarily or more permanently adding indicia to the base 11 which will facilitate ease in studying and computing the interrelationship of notes in the various scales. Of course, as noted before, the major 3rd indicia 28 and minor 3rd indicia could both be permanent indicia on base 11.

Figure 6:
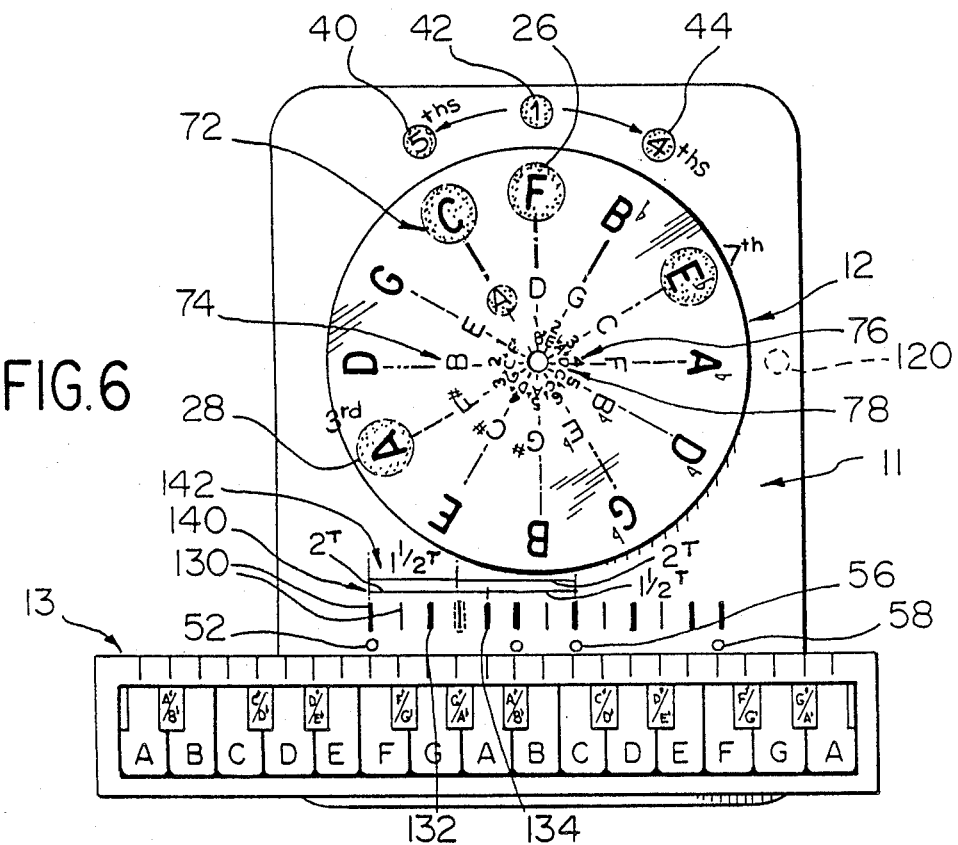

In addition to or alternative to lines 102, 104, 106 and the like (FIG. 1) or lines 110, 112 and 114 and the like (FIG. 5), the student may draw heavy lines or highlight with a coloured marking device, divisions such as shown in FIG. 6 which illustrate lines 130, 132, 134 and the like characteristic of the scales, in this case, the scale of F major. Also tone/semitone semitone division of major and minor scales are shown by lines 140 (major), 142 (minor) (i.e. major 2T/1½T-minor 1½T-2T).

To determine the characteristics by way of example of F major scale, the "F" on disc 12 is located in indicia 26 and F on the keyboard is located on the line 130 of lines 50, as shown in FIG. 6. It will be noted:

(1) the first triad chord with the base note F is F, A and C (the "1"-"3rd" and "5th" notations, i.e. alternate notes);

(2) the major (prime) chords in the scale of F major have base notes F, B$^b$ and C (note names in indicias with "1"-"4th" and "5th" notations);

(3) the key signature for F major scale is 1 flat, i.e. B flat (B$^b$) (indicia series 76 and 78);

(4) the related minor scale having the same key signature is D minor, the prime chords of minor scale D being D, G, A (and with "minor 3rd" marker 120, the triad D F A from indicia 74);

(5) the notes of the prime chords can be visually read from the keyboard 13 as aligned including B flat (B$^b$) i.e. F, B$^b$, C as well as the triad F A C; and (6) indicia 52–54 and 56–58 opposite keys F B$^b$ and C–F reference the correct division of the octave for the tetra chord structure of F major.

FIG. 6 also shows how a student can interrelate major chords and minor chords, for example, with the keyboard 13 and lines 140, 142 showing the tone/semitone relationship for major/minor scales. The student will note that F major has prime chords F A C (F-A, 2T, and A-C 1½T) whereas F minor has prime chords F A$^b$ (F-A$^b$, 1½T and A$^b$-C, 2T). Further, using marker 120 as a reference location for the minor 3rd, the student looking at the series 72 indicia of disc 12 on base 11 will note that the "F" major chord and "F" minor chord (using the same series 72 of indicia) are F A C and F A$^b$ C respectively. Accordingly, the student will appreciate the interrelationship between the theory displayed by the disc/base elements with the realities of the keyboard element in conjunction with base element.

Further with the device, the registry of the notes of indicia series 72 on disc 14 with indica 16 on base 12, going counterclockwise gives information concerning major chord progressions in "5ths", e.g. chord C E G to chord G B D to chord D G$^b$ A and so on. In the clockwise direction, chords progress in "4ths", e.g. chord C E G to chord F A C to chord B$^b$ D F and so on. (It will also be appreciated that by alignment of series of indicia 72 with lines 16 and indicia 42, 120 and 40, minor mode chord progression of 4th's and 5th's is provided).

The invention is also easily usable for understanding and determining the transposition of instruments and key signatures. Within a band for example, there are various instruments and when band music is arranged, different "keys" are used to achieve the same "pitch" or concert pitch. By way of example, within a band there are:

(a) "C" instruments such as the flute and oboe.
(b) "B$^b$ instruments such as the clarinet, tenor sax and trumpet.
(c) "E$^b$ instruments such as the alto sax, and
(d) "F" instruments such as the French horn.

In arranging band music with (a) "C" instruments there is no change from concert pitch.
(b) "B$^b$ instruments the music is written "up" 2 semitones.
(c) "E" instruments the music is written "down" 3 semitones.
(d) "F" instruments the music is written "up" 7 semitones.

Figure 7:
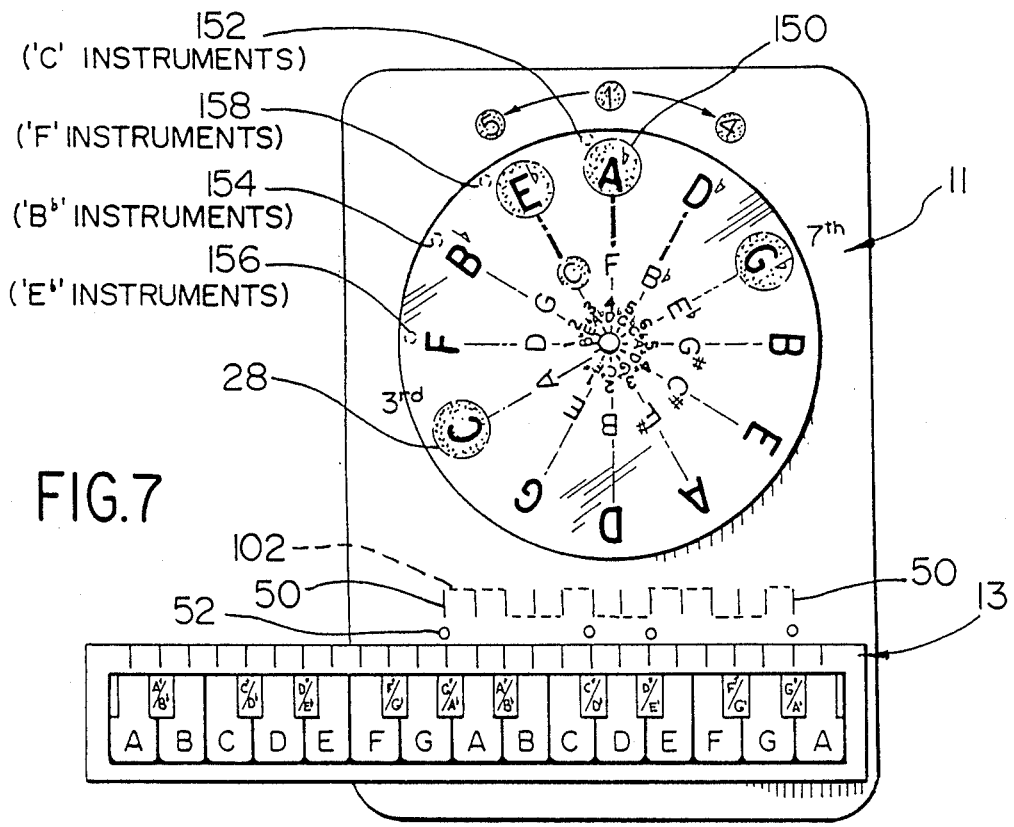

Accordingly, looking at FIG. 7, assuming the concert pitch is A$^b$ (150) then with (a) "C" instruments (reference location 152)—the pitch is A$^b$ (no change),
(b) "B$^b$" instruments (reference location 154)—the pitch is B$^b$ (up 2 semitones),
(c) "Eb" instruments (reference location 156)—the pitch is F (down 3 semitones),
(d) "F" instruments (reference location 158)—the pitch is E$^b$ (up 7 semitones).

One simply has to remember the order of the instruments with respect to the reference locations 150-158 i.e. from top 150 ("C" instruments (152) going counter-clockwise, F instruments (158), B$^b$ instruments (154) and E$^b$ instruments (156)). Alternatively a removable marker pen dot or permanent dot symbol (e.g. dotted circles 150-158 in FIG. 7) can be placed on the base 11 to more clearly identify the location of the "instrument" key.

Figure 8:
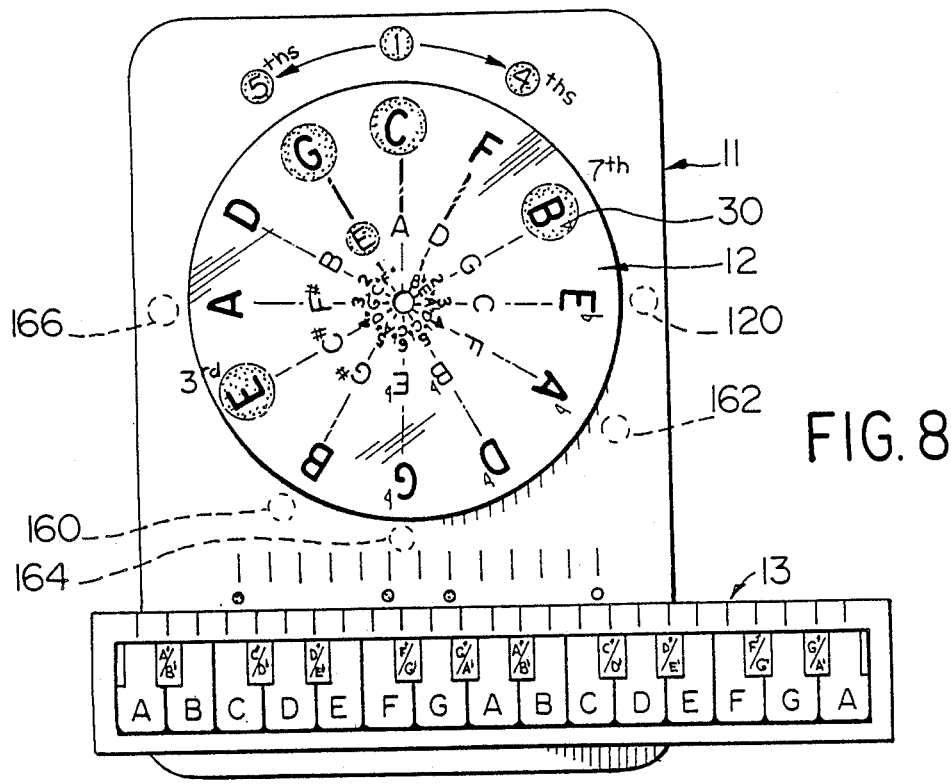

FIG. 8 shows a disc/base/keyboard combination for a C scale, which is used to show further interrelationships which can be illustrated by the invention and to which, depending on the experience and knowledge of the student can be assisted visually with the use of temporary markings such as a dot or marker similar to that referred to for marker 120 above. From FIG. 8, it will of course be apparent that C major has a triad with base note C of C E G ("1", "3rd", "5th" notations). Four note chords are also provided. For example, the "7th" notation (indicia 30) provides the dominant 7th chord C E G B$^b$. If a major 7th chord was desired to be referenced, the "7th" (fourth) note of the chord is raised a semitone to B and dot 160 (either by pen or a coloured marker) references the location for the major 7th, i.e. the fourth note in the major 7th, i.e. C E G B, in C major scale.

An augmented chord is a triad wherein the "5th" note is raised a semitone.

From the keyboard, there is seen a C E A$^b$ and location reference dot 162 shows where on the disc/base elements the augmented 5th note is found and a mark can be placed for reference purposes.

Whereas a C major triad with base note C is C E G, the diminished triad drops both the "3rd" and the "5th" by a semitone. From the keyboard, this would be seen as C E$^b$ G$^b$ and location reference dots 120 (minor 3rd) and 164 (minor 5th) give the related information from the disc/base elements.

The diminished "7th" chord (4 notes) of C major or otherwise known as C diminished 7th would be C E$^b$ G$^b$ A, the A being given by the reference location marker 166.

Accordingly, although I have shown a simplified base/disc/keyboard combination, the addition of markers, tabs or other selectively removable or eraseable indicia to the base will permit the student to visually interrelate more advanced theory with the keyboard.

Although I have shown the keyboard 13 as simply located or resting on base plate 11 in a horizontal orientation for individual pupil use, larger models for the teacher are preferably constructed whereby the keyboard 13 is divided into two sections and rail means are provided such that the keyboard will be supported in a slidable relationship to the base plate 11.

Figure 9:
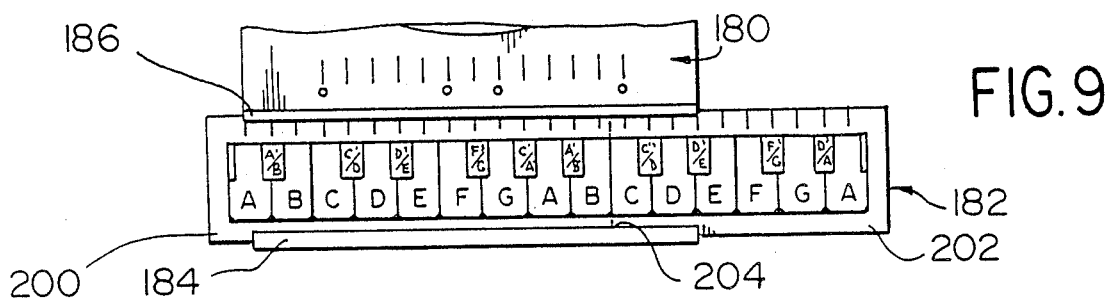
FIG. 9 is a partial front elevational view of the invention showing means for slidably connecting the keyboard to the base plate.
Figure 10:
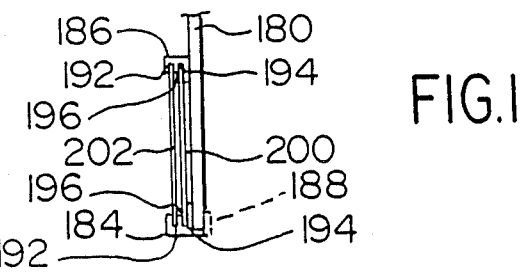
FIG. 10 is a partial side elevational view of the device in FIG. 8.

More particularly turning to FIG. 9, there is shown a partial front elevational view of the base 180 and keyboard 182 (the disc not being shown). FIG. 10 illustrates a side view of the device of FIG. 9. Channel members 184 and 186 are secured by any suitable means to base plate or board 180 such as pressure adhesive means associated with back 190. An alternative with respect to bottom channel 184 is to have a channel including an integral clip element 188 shown in dotted lines in FIG. 10. Clip 188 clips onto the bottom edge of base 180. Channel 184 opens upwardly whereas channel 186 opens downwardly and the channel members 184 and 186 are made of extruded plastic material with two grooves 192, 194 separated by divider 196.

Keyboard 182 is divided into two sections 200, 202 since on a large teaching model, the total length of keyboard 182 would be about 3 feet. Keyboard 182 has outside sliding section 200 and inner sliding section 202, each slidable within channel member grooves 192, 194 respectively. Although the division of sections 200 and 202 may be made anywhere, I have found that providing a division at 204, between keys B and C provides a suitable division. Although an overlap of a key can be provided, it is not necessary and the two sections 200 and 202 are simply moved within their respective channel grooves and aligned so that keys B and C are adjacent. The divison of keyboard 182 into parts is simply for convenience in storing the apparatus.

Figure 11:
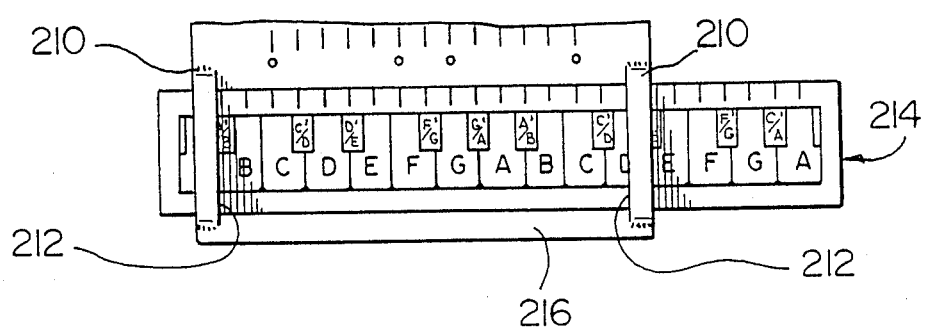
FIG. 11 is a partial front view of an alternating means of slidably connecting the keyboard to the base plate.

It will also be apparent from FIG. 11 that even with smaller units, straps 210, defined by part of the base plate material and slot 212, can be provided and will provide means to slidably connect the keyboard 214 to the base plate 216. Further, it will be apparent that with appropriate materials, an easily releasable magnetic connection between keyboard 13 and base 11 is possible simply to keep the keyboard 182 in place at the selected relative locations on the base 180.

Figure 12:
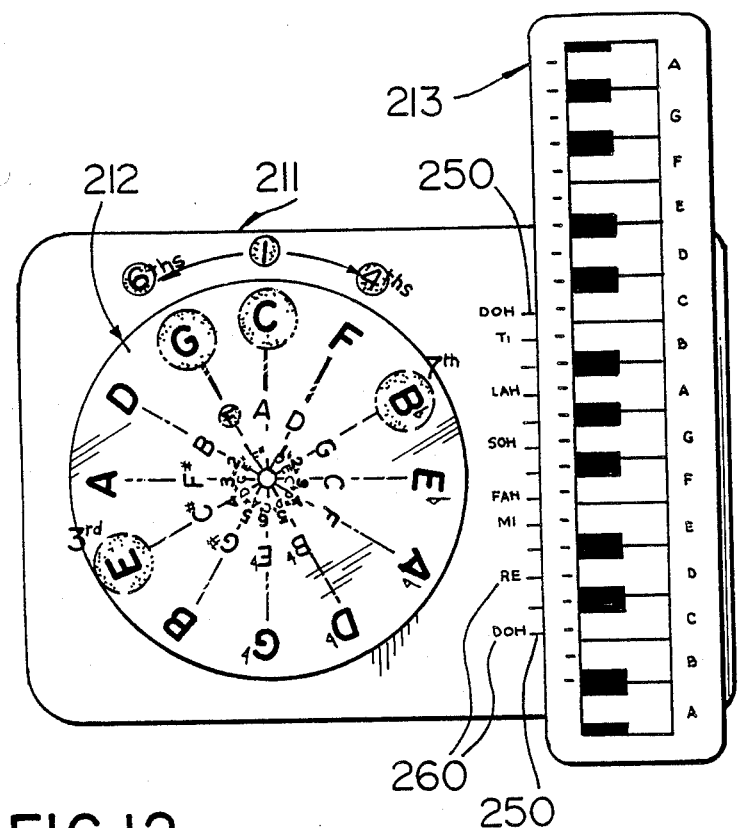
FIG. 12 illustrates a modification of the invention wherein the keyboard is located to one side of the disc.

FIG. 12 illustrates a modified embodiment wherein lines 250 are displayed to one side of disc 212 on base plate 211, and keyboard 213 has notations facilitating reading of the keys in such orientations. Other indicia such as the "doh", "ray", "me", etc., 260 may also be placed on the base 211 whether temporary or permanent, for the benefit of the user, such as a singer. The use and operation of the modified device of FIG. 11 is obviously similar to that of FIG. 1.

Figure 13:
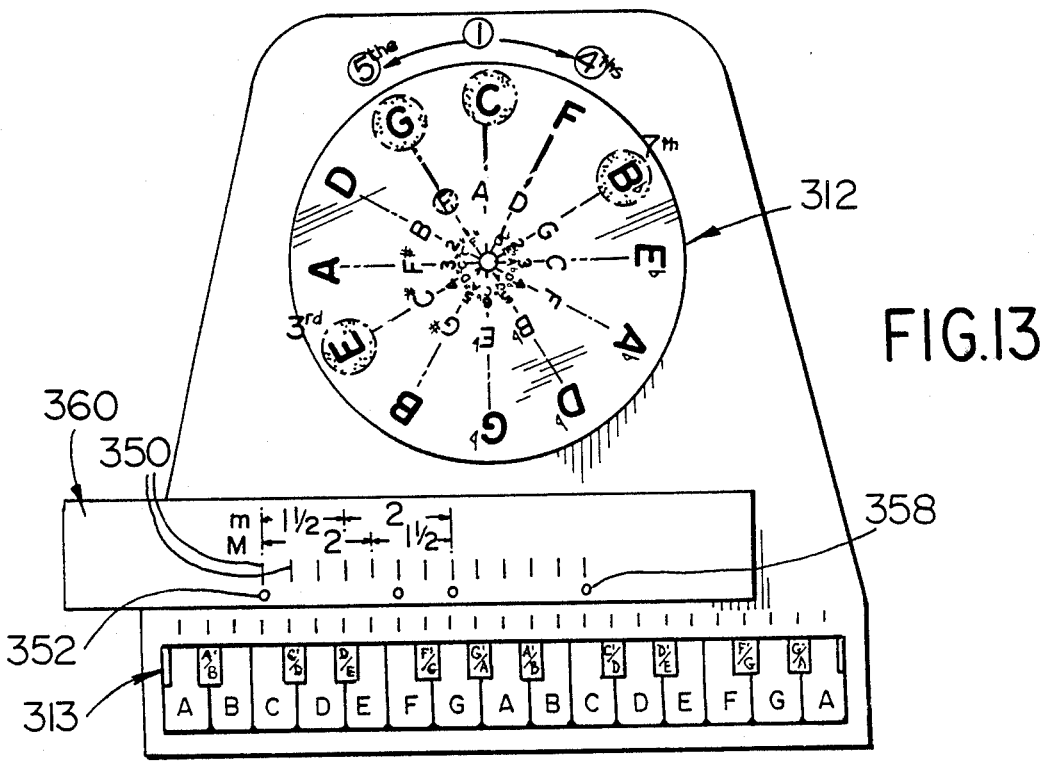
FIG. 13 illustrates a still further modification wherein the keyboard indicia forms part of the base plate and the indicia representing tonal intervals is moveable relative thereto.

FIG. 13 illustrates a variation in which the keyboard 313 is part of the base plate 311 as well as disc 312, and the indicia representing lines 350 and indicia 354-358 is selectively movable as a unit on display piece 360. Also shown for illustrative purposes are the interval tone/semitone relationship for major (M) and minor (m) scales and these are the type of markings or indicia which is selective and erasable. It will be apparent that display piece 360 is movable to and capable of being aligned with the appropriate note on keyboard 313 whereby the interrelationship of the elements of the invention, as well as the information provided, are preserved and apparent.

Other modifications to the invention will be apparent to those skilled in the art and I claim all those which fall within the spirit of the invention and the appended claims.

The embodiments of the invention in which an exclusive property or privilege is claimed are defined as follows:

1. Music teaching apparatus comprising a display base, a circular display disc rotatably associated with said base, and a display keyboard moveable relative to said display base;
   said base having first indicia including a circular array of twelve equally spaced, radially extending, lines and having second indicia spaced from said first indicia, said second indicia including a linear array of thirteen, equally spaced, parallel lines;
   said disc having third indicia in a circular array, said third indicia representing twelve notes of an octave, which notes are at intervals of two and one-half tones on a musical scale, and the progression of notes, in a first direction, being according to 4th intervals and, in a second, opposite direction, being in accordance with 5th intervals, said notes being angularly spaced for registration with lines of said first indicia;
   said keyboard providing fourth indicia comprising representation of at least one octave of a piano keyboard including white and black keys, the spacing of said keys coinciding substantially with the spacing of the linear array of lines of said second indicia;
   whereby registration of a note from the disc third indicia with a line of said first indicia at the 12 o'clock position, hereinafter denoted as a base note, provides registration of other notes of the third indicia with other lines of the first indicia, and provides information about the prime chords of the base note from said registration of said base note and registration of notes of said other notes in registration with the 1 and 11 o'clock positions; and
   registration of a key of the base note as represented on the keyboard fourth indicia with the first line of said second indicia provides spacial information as to the prime chords of said base note on the keyboard fourth indicia in registration with the first, sixth and eighth lines from the left of said second indicia.

2. The apparatus according to claim 1 wherein the lines of said first indicia in the 11, 12 and 1 o'clock positions are highlighted relative to the other first indicia lines and the first, sixth and eighth lines of said second indicia are highlighted relative to the other second indicia lines.

3. The apparatus of claim 2 wherein, said keyboard fourth indicia includes notations of the names of notes.

4. The apparatus of claim 2 wherein said base has fifth indicia superintending each of the lines of said first indicia in the 11, 12 and 8 o'clock positions and located for overlap registration by said notes of said third indicia whereby registration of said base note with the 12 o'clock positioned line also provides information of a triad chord of said base note from the notes of said third indicia falling on said fifth indicia.

5. The apparatus of claim 4 wherein the thirteenth line of said second indicia is highlighted whereby the highlighted lines of said second indicia provide reference on the keyboard fourth indicia of the correct division of the octave for the tetrachord structure of the base note.

6. The apparatus of claim 4 in said disc includes sixth indicia in a circular array radially inwardly of said third indicia array, said sixth indicia representing twelve notes of an octave which notes are at intervals of two and one-half tones on a musical scale, each note of said sixth indicia being in radial register with a note of said third indicia such that each third and sixth indicia notes in radial registry represent related major and minor scales having like key signatures.

7. The apparatus of claim 6 wherein said disc includes seventh indicia in a circular array radially inwardly of said sixth array, said seventh indicia comprising information indicating the actual key signatures of the related major and minor scales.

8. The apparatus of claim 4 wherein said base has eighth indicia superintending the line of said first indicia in the 2 o'clock position which eighth indicia is located for overlap registration with notes of said third indicia, whereby such eighth indicia in conjunction with said fifth indicia provides information as to the dominant 7th chord of the base note.

9. The apparatus of claim 8 wherein said highlighted lines of said first and second indicia are highlighted with a single colour and the fifth and eighth indicia are similar in shape and colour which colour is distinct from the colour of the highlighted lines of said first and second indicia.

10. The apparatus of claim 1 wherein said base includes ninth indicia comprising the notation "1", "3rd", "4ths", "5ths" and "7th" adjacent the radial lines at the 12 8, 1, 11 and 2 o'clock positions.

11. The apparatus of claim 1 wherein the base is constructed with a surface from which temporary indicia markings by a marking device may be easily removed.

12. The apparatus of claim 1, including pressure adhesive markers with peelable backing, said base constructed with a surface from which said markers are peelable whereby the markers are used to temporarily identify and reference locations on the base having desired musical interrelationships with permanent indicia thereon.

13. Music teaching apparatus comprising a display base, a circular display disc rotatably associated with said base, and a display movable relative to said base;
   said base having first indicia including a circular array of twelve equally spaced, radially extending, lines having second indicia spaced from said first indicia, said second indicia comprising a representation of a piano keyboard of at least one octave including white and black keys;
   said disc having third indicia in a circular array, said fourth indicia representing twelve notes of an octave, which notes are at intervals of two and one-half tones on a musical scale, and the progress of notes in the clockwise direction is according to 4th intervals and in the counterclockwise direction is in accordance with 5th intervals, said notes being angularly spaced for registration with said first indicia on said base;
   said movable display having fourth indicia comprising a linear array of thirteen equally spaced, parallel lines, the spacing of said lines coinciding substantially with the spacing of the keys of said keyboard;

whereby registration of a note from the disc third indicia with a line at the 12 o'clock position on the base, hereinafter denoted the base note, provides registration of other notes of the third indicia with other lines of the first indicia and provides information about the prime chord of the base note, said registration at the 12 o'clock position and from registration of other notes of the third indicia with lines of the first indicia in the 1 and 11 o'clock positions, and registration of the first line of said fourth indicia on said movable display with the key of the base note on the keyboard provides spacial information as to the prime chords of said base note on the keyboard in registration with the first, sixth and eighth lines of said fourth indicia.

14. The apparatus according to claim 13 wherein the lines of said first indicia in the 11, 12 and 1 o'clock positions are highlighted relative to the other first indicia lines and the first, sixth and eighth lines of said fourth indicia are highlighted relative to the other fourth indicia lines.

15. The apparatus of claim 14 wherein, said keyboard second indicia includes notations of the names of the notes on the keyboard.

16. The apparatus of claim 15 wherein said base has fifth indicia superintending each of the lines of said first indicia in the 11, 12 and 8 o'clock positions and located for overlap registration by said notes of said third indicia whereby registration of said base note with the 12 o'clock positioned line also provides information of a triad chord of said base note from the notes of said third indicia falling on said fifth indicia.

17. The apparatus of claim 16 wherein said disc includes sixth indicia in a circular array radially inwardly of said third indicia array, said sixth indicia representing twelve notes of an octave which notes are at intervals of two and one-half tones on a musical scale, each note of said sixth indicia being in radial register with a note of said third indicia such that each third and sixth indicia notes in radial registry represent related major and minor scales having like key signatures.

18. The apparatus of claim 17 wherein said disc includes seventh indicia in a circular array radially inwardly of said sixth array, said seventh indicia comprising information indicating the actual key signatures of the related major and minor scales.

19. The apparatus of claim 16 wherein said base has eighth indicia superintending the line of said first indicia in the 2 o'clock position which eighth indicia is located for overlap registration with notes of said third indicia, whereby such eighth indicia in conjunction with said fifth indicia provides information as to the dominant 7th chord of the base note.

* * * * *